United States Patent [19]
Schumacher et al.

[11] Patent Number: 5,633,059
[45] Date of Patent: May 27, 1997

[54] VENEER FOR CURVED SURFACES UTILIZING ADHESIVE WITH SELECTIVE FLEXIBILITY OUTSIDE THE JOINT SEAM REGION

[75] Inventors: Rolf Schumacher, Sindelfingen; Klemens Barth; Kaspar Worms, both of Boeblingen, all of Germany

[73] Assignee: Mercedes-Benz AG, Stuttgart, Germany

[21] Appl. No.: 408,008

[22] Filed: Mar. 21, 1995

[30] Foreign Application Priority Data

Mar. 21, 1994 [DE] Germany ............... 44 09 572.4

[51] Int. Cl.⁶ ........................................... B32B 3/00
[52] U.S. Cl. ............... 428/58; 428/59; 428/195; 428/537.1; 428/511; 156/265; 156/266; 144/254; 144/270
[58] Field of Search .................. 428/195, 345, 428/349, 541, 511, 106, 479.6, 537.1, 58, 59, 61; 156/265, 266, 244.11, 244.21, 244.27; 144/309 W, 313, 315 A, 317, 270, 254, 344

[56] References Cited

U.S. PATENT DOCUMENTS 4,205,107  5/1980  Jaschke et al. ............... 428/58
4,374,692  2/1983  Sümeghy .
4,406,099  9/1983  Barett ......................... 52/127.3

FOREIGN PATENT DOCUMENTS

4135658A1  10/1991  Germany .
B45-32152 U  12/1970  Japan .
B58-45049 U  10/1983  Japan .
2-281901A  11/1990  Japan .
4-216001A  8/1992  Japan .

Primary Examiner—Merrick Dixon
Attorney, Agent, or Firm—Evenson, McKeown, Edwards & Lenahan, P.L.L.C.

[57] ABSTRACT

A veneer for the veneering of especially curved surfaces has a face veneer formed from thin veneer sheets. The veneer sheets are adhesively bonded along their edges so as to be butted flush and on the side opposite the visible side to a mock veneer which is arranged underneath and which extends over the entire region of the face veneer. To maintain the relative movability between the veneer sheets and the mock veneer, an adhesive is coated on underneath the veneer sheets and is influenced in its setting reaction. In terms of the setting reaction, the adhesive is still reactive over a particular timespan. Thus, when the veneer is finally applied, the adhesive does not tear apart at the joints during a shaping curvature of the veneer because the adhesive in the joint region of adjacent edges of the veneer sheets is set completely.

3 Claims, 2 Drawing Sheets

VENEER FOR CURVED SURFACES UTILIZING ADHESIVE WITH SELECTIVE FLEXIBILITY OUTSIDE THE JOINT SEAM REGION

BACKGROUND AND SUMMARY OF THE INVENTION

The present invention relates to a veneer for veneering of especially or relatively sharply curved surfaces and to a process for producing the veneer. More particularly, the present invention relates to a veneer comprising visible-side face veneer formed from thin veneer sheets butted against one another and adhesively bonded along edges thereof so as to be butted flush in a joint region and, on a side opposite a visible side, to a carrier material arranged underneath, an adhesive coated on underneath the veneer sheets and selected to be influenceable in a setting reaction which is reactive over a predetermined timespan. The present invention also relates to a process comprising the steps of butting the veneer sheets flush against one another along common edges thereof onto the carrier material to form a face veneer, fixing the veneer sheets in position and adhesively bonding the veneer sheets to the carrier material, with adhesive, which is selectable to be influenceable in setting reaction, remaining flexible, even after the bonding connection of the veneer sheets to the carrier material, and still remaining reactive for a predetermined timespan.

DE 4,135,658 A1 describes a process for producing a veneer, particularly a fine-wood veneer. The veneer is formed by a carrier material, for example a nonwoven consisting of polyester fibers, on which a veneer material is adhesively bonded. To allow the veneer to remain more flexible when the veneer material is bonded, so that, among other things, curved surfaces can be veneered in a simple way, the veneer material is first bonded to the carrier material at low temperatures before the adhesive has hardened completely. The advantage of this approach is that veneers of this type can be stored for several days or weeks without the adhesive setting. As a result, in terms of its setting reaction, the adhesive is still reactive over this timespan. The final setting or hardening of the adhesive takes place at temperatures and at a pressure which are increased in relation to normal conditions.

In order to save material and to some extent also weight, attempts have recently been made to assemble the face veneer from thin veneer sheets, the sheet thickness of which is smaller than 0.5 mm, in particular approximately 0.2 mm. For this purpose, one edge of a veneer sheet is butted flush against the edge of the adjacent veneer sheet and is bonded to the carrier material. The bonding of the veneer sheets has hitherto been carried out by bonded-on taping paper or by a thread of glue deposited in zigzag form. H/wever, in these thin veneer sheets of small sheet thickness (i.e., smaller than 0.5 mm, especially approximately 0.2 mm), the thread of glue or the taping paper, but also the structure of the carrier material, forms a contrast on the visible side of the veneer. Consequently, veneers produced in this manner are unacceptable due to their poor surface quality on the visible side. Contrasts, especially elevations, of the type mentioned cannot be sanded out in such thin-layer veneers, since there is then always the risk that the veneer sheet will be sanded through. Furthermore, during, for example, the shaping of the veneer and/or during pressing for the bonding with the carrier material, the butt joints between the individual veneer sheets can also tear apart, thereby resulting in a reject.

An object of the present invention is to improve the basic veneer as well as a production process therefor, to the effect that veneers formed from thin veneer sheets can, with high reliability, also be produced with an acceptable surface quality on the visible side.

The foregoing object has been achieved in a veneer product in which the carrier material is mock veneer extending entirely over the face veneer, the adhesive in the joint region of the adjacent edges of the veneer sheets is selected to set at least reactivatably with sufficient bonding between the veneer sheets and the carrier material, and the adhesive in the remaining surface of the veneer sheets is at its most adhesive while remaining flexible and reactive. With regard to the process, the mock veneer is applied to the thin veneer sheets on a side opposite a visible side, the adhesive in the joint region sets at least reactivatably, and, in a remaining region of the veneer sheets, is first still kept flexible and reactive and only after a final application of the veneer to a surface is set at the remaining region.

The adhesive, which, in well known chemical terms, assumes a so-called B-state, hardens in the region of the joint seam of the veneer sheets with a bonding effect and in a reactivatable manner. Likewise, the flexibility and reactivity of the adhesive, applied to the remaining surface and having at most an adhesive effect, are preserved. Thus, veneers according to the present invention can be bent, while the adhesive does not form a contrast on the visible side and also the seams do not tear apart.

Because a so-called mock veneer, which can be produced, for example, from a cheap wood and/or a plurality of layers of wood veneer, is used as a carrier material, no disturbing contrasts on its surface structure occur on the visible side of the veneer.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
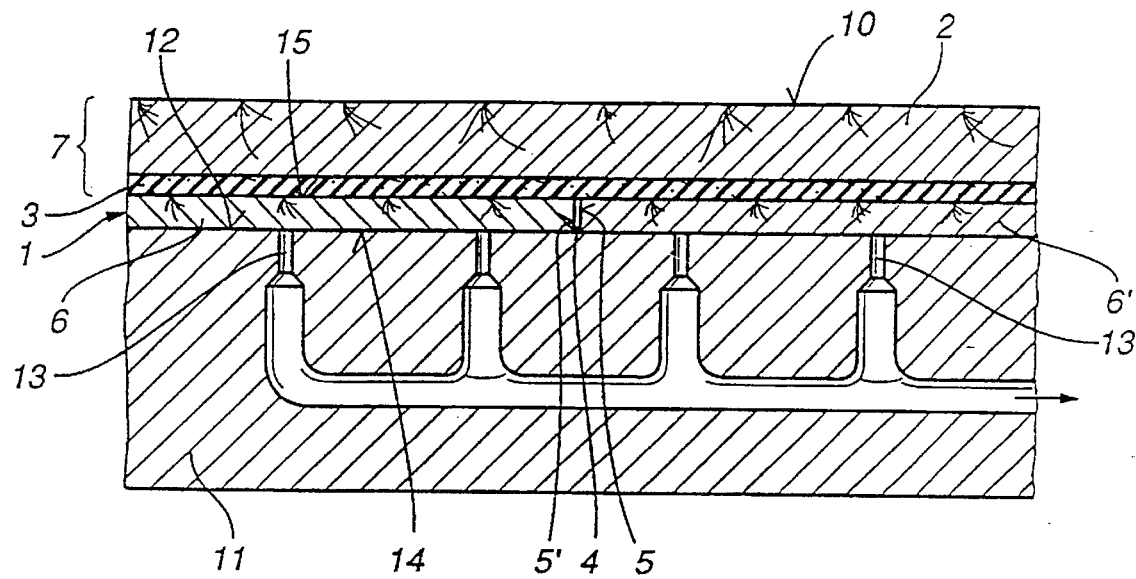
FIG. 1 is a cross-sectional view through a bottom die section of a device for producing the veneer.

FIG. 1 shows a cutout from a bottom die 11 of a device for producing a veneer 7 according to the present invention. The complete device is illustrated in two modifications in FIGS. 2 and 3. The bottom die 11 of the device is equipped with a holding device for the veneer sheets 6, 6'. The holding device has, on the bearing side 12 of the veneer sheets 6, 6', orifices 13 which are connected to a vacuum-generating appliance, for example a pump. The veneer sheets 6, 6' forming the face veneer 1 of the veneer 7 are deposited with their visible side 14 on the bearing side 12 of the bottom die 11 and are butted against one another with their adjacent edges 5, 5' in the joint region 4. The pump is switched on so that the veneer sheets 6, 6' are fixed in position.

An adhesive 3, which can be influenced in its setting reaction, is coated onto the entire rear side 15 of the fixed face veneer sheets 6, 6'. This coating can be carried out either over the full surface or at particular points. In view of the risk that the adhesive coating will form a contrast on the visible side 14 of the face veneer 1, an adhesive coating of the entire surface is more advantageous.

Subsequently, the mock veneer 2, which can be made from a cheap wood, such as, for example, beech, is deposited on the rear side 15 which has provided with the adhesive 3, where it is held adhesively, but is still displaceable, since the adhesive 3 has still not hardened in any region. The adhesive connection, that is to say the "tack" of the adhesive 3, is expediently made by using an adhesive 3 which has a hardening reaction initiated by the moisture contained in the mock veneer 2 and/or in the veneer sheets 6, 6'. Such an adhesive 3 is expediently a heat-activatable adhesive film which can be cut according to the surface of the veneer 7.

A&ter the mock veneer 2 has been laid on the rear side 15 of the face veneer 1 having the adhesive 3, an ultrasonic sonotrode 8 (FIG. 2) or a high-frequency electrode 9 (FIG. 3) is applied under pressure to the side 10 of the mock veneer 2 opposite the visible side, above the joint region 4 of the veneer sheets 6, 6', as a connecting tool for joining the veneer sheets 6, 6' together with the associated region of the mock veneer 2, and is actuated. The adhesive 3 is thereby activated solely in the joint region 4 and hardens reactivatably, at the same time changing to the so-called chemical B-state which has sufficient "tack" to hold the veneer sheets 6, 6' more securely, until the final hardening takes place during pressing to form a molding. As a result, the joint region 4 of the veneer sheets 6, 6' is connected immovably to the mock veneer 2 functioning as a carrier material. In all other regions of the veneer sheets 6, 6', however, the adhesive 3 is dry, with the result that the veneer sheets 6, 6' are relatively movable in relation to the mock veneer 2, this being advantageous especially during the final veneering of curved surfaces with a veneer 7 according to the present invention.

The advantage of the foregoing is that, inter alia, during the shaping curvature of the veneer 7, at most minor stresses to be compensated by the adhesive 3 can occur between the face veneer 1 and the mock veneer 2, and in that the joint between two veneer sheets 6, 6' does not tear apart also, inter alia, as a result of the minor stresses, at most, between the face veneer 1 and the mock veneer 2. The same effect can also be achieved, in many uses, when the adhesive 3 hardens completely in the joint region 4. Furthermore, the adhesive 3 can connect the veneer sheets 6, 6' adhesively to the mock veneer 2 in the remaining regions of the veneer sheets 6, 6' arranged outside the joint region 4, but nevertheless allow a relative movement in relation to the mock veneer 2 in the plane of the mock veneer 2.

Figure 2:
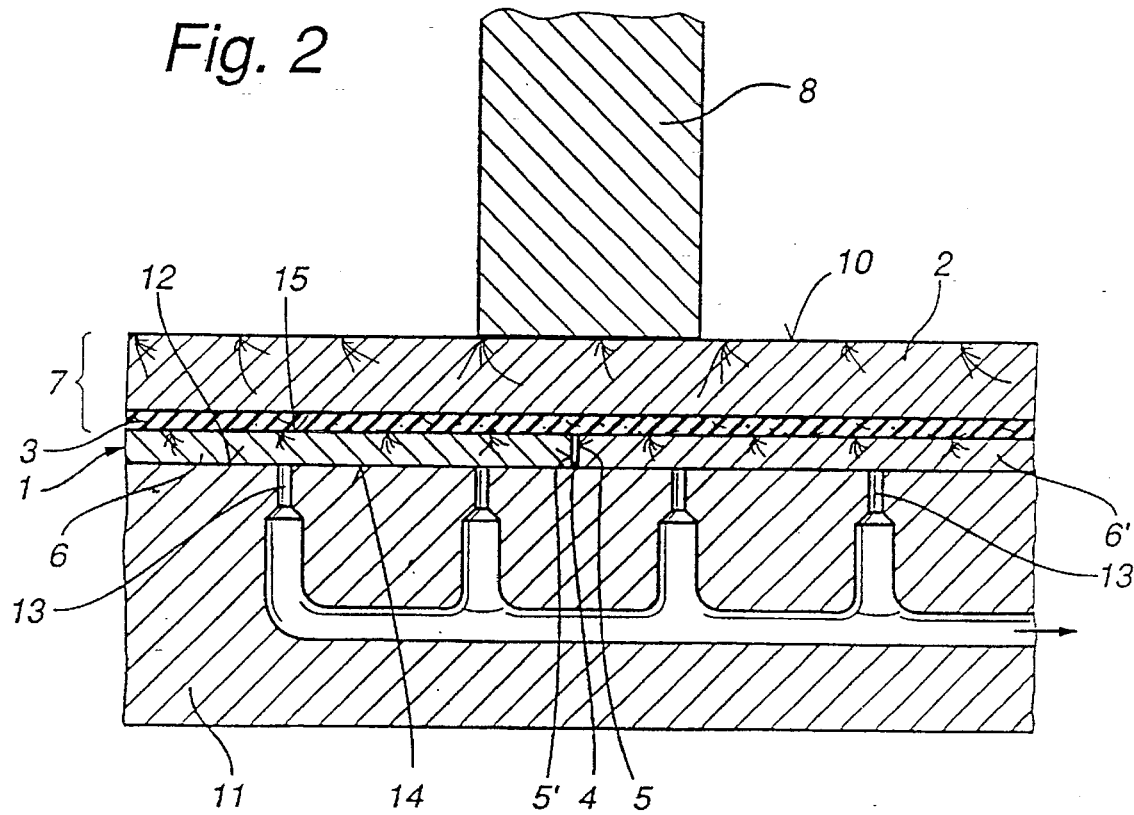
FIG. 2 is a cross-sectional view through an ultrasonic device for producing the veneer.

FIG. 2 shows a section through an ultrasonic device for producing the veneer 7. The use of an ultrasonic sonotrode 8 is advantageous when the joint region 4 of the veneer sheets 6, 6' is to be connected to the mock veneer 2 permanently and in a fixed position at particular points. The necessary joining pressure is first exerted by the sonotrode 8 of the ultrasonic device. The energization of the sonotrode 8 causes a heating and melting of the adhesive 3 coated on in a film-like manner. Since the friction and therefore the heating in the joining part is generated predominantly in the adhesive 3, the sonotrode 8 remains relatively cold, with the result that the heat present in the joint region 4 is dissipated relatively quickly again via the sonotrode 8. Short machining or pressing times advantageously occur here.

Figure 3:
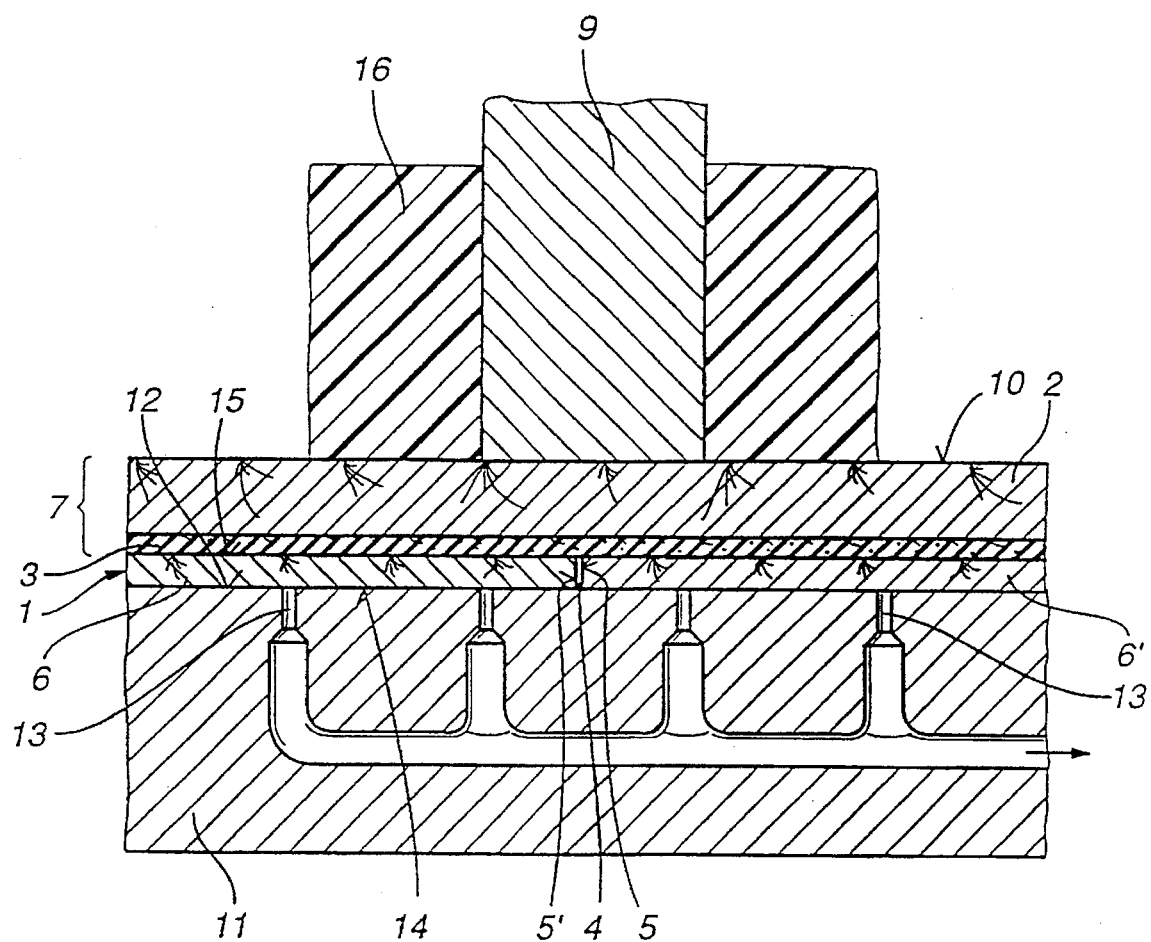
FIG. 3 is a cross-sectional view through a high-frequency device for producing the veneer.

FIG. 3 shows a high-frequency device for producing the veneer 7. The use of a high-frequency electrode 9 is advantageous when the joint region 4 of the veneer sheets 6, 6' is to be connected to the mock veneer 2 permanently and in a fixed position in a continuous manner. I. this procedure, a press plate 16, in which the high-frequency electrode 9 is incorporated above the joint region 4 of the veneer sheets 6, 6', is applied to the adhesive-free side 10, opposite the visible side, of the mock veneer 2 resting in a specific position on the bottom die 11. A&ter the electrode 9 has been applied under pressure to the side 10 of the mock veneer 2 opposite the visible side, the high-frequency field is switched on and the adhesive 3 is heated in the joint region 4. As with the use of ultrasonics, the adhesive 3 is thereby activated in the joint region 4 and hardens reactivatably or completely so that the joint region 4 is subsequently connected immovably to the mock veneer 2 functioning as a carrier material. I. all other regions of the veneer sheets 6, 6', these can be connected adhesively to the mock veneer 2 by the adhesive 3, but are nevertheless relatively movable in relation to the mock veneer 2 in the plane of the latter. This is advantageous, as previously mentioned, especially during the final veneering of curved surfaces with a veneer 7 according to the invention.

So that the press plate 16 does not heat up when a high-frequency field is applied, it is particularly advantageous to produce the press plate from a material which, at the applied frequency, is coupled to the generated electromagnetic field in a known manner and thereby heats up, at most, only slightly. A further embodiment contemplates transmitting the pressure in the joint region 4 of the veneer sheets 6, 6' solely via the electrode 9 itself.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Veneer for curved surfaces, comprising individual visible-side face, thin veneer sheets suitably configured to be bent and adhesively bonded along edges thereof so as to be butted flush against one another in a joint region and, on a side opposite the visible-side face, to a carrier material arranged thereunder, and an adhesive coated on underneath the veneer sheets and having setting reaction which is differentially reactive over a predetermined timespan, wherein the carrier material is mock veneer extending entirely over the face veneer, and the differentiable setting reaction is such that the adhesive in the joint region of the adjacent edges of the veneer sheets is selected to set at least reactivatably with sufficient bonding between the veneer sheets and the carrier material, while the adhesive over the remaining surface of the veneer sheets is unset so as to remain flexible and reactive to permit relative motion between the veneer sheets and the carrier material outside the joint region.

2. The veneer according to claim 1, wherein the adhesive in the joint region is set completely.

3. The veneer according to claim 1, wherein the adhesive is a dry heat-activatable adhesive which is dry outside the joint region.

* * * * *